(12) United States Patent  (10) Patent No.: US 8,044,532 B2
Miyamoto  (45) Date of Patent: Oct. 25, 2011

(54) WIRING ARRANGEMENT FOR A VEHICLE

(75) Inventor: Takehiro Miyamoto, Shizuoka-ken (JP)

(73) Assignee: Yamaha Hatsudoki Kabushiki Kaisha, Iwata-Shi (JP)

( * ) Notice: Subject to any disclaimer, the term of this patent is extended or adjusted under 35 U.S.C. 154(b) by 696 days.

(21) Appl. No.: 12/155,057

(22) Filed: May 29, 2008

(65) Prior Publication Data

US 2008/0298078 A1 Dec. 4, 2008

(30) Foreign Application Priority Data

May 30, 2007 (JP) .................................. 2007-143055

(51) Int. Cl.
   *B60L 1/14* (2006.01)
(52) U.S. Cl. ...................................................... 307/10.8
(58) Field of Classification Search .................. 307/10.8, 307/9.1, 10.1; 315/82, 83; 362/459, 473
   See application file for complete search history.

(56) References Cited

U.S. PATENT DOCUMENTS

| 4,189,762 | A  | * | 2/1980 | Nakazawa ..................... 362/475 |
| 5,946,957 | A  | * | 9/1999 | Yamamoto et al. ............. 70/423 |
| 6,951,417 | B2 | * | 10/2005 | Ito et al. ......................... 362/547 |
| 7,128,454 | B2 | * | 10/2006 | Kim et al. ....................... 362/507 |
| 7,278,763 | B2 | * | 10/2007 | Sizemore ....................... 362/376 |

FOREIGN PATENT DOCUMENTS

JP 62-32886 2/1987

* cited by examiner

*Primary Examiner* — Albert W Paladini

(74) *Attorney, Agent, or Firm* — Rabin & Berdo, PC

(57) ABSTRACT

A motorcycle includes a main switch, a main switch wiring connected to the main switch and extending downward from the main switch, and a headlight stay for supporting a headlight part provided in a vicinity of a lower part of the main switch as seen from a side of the vehicle. The motorcycle is constructed so that the main switch wiring extending downward from the main switch is disposed in an inside, concave portion of the headlight stay.

16 Claims, 14 Drawing Sheets

WIRING ARRANGEMENT FOR A VEHICLE

BACKGROUND OF THE INVENTION

1. Technical Field

The present invention relates to a vehicle, for example a motorcycle, and in particular to a wiring arrangement for a vehicle.

2. Background Art

A vehicle, such as a motorcycle, having a wiring member is known. For example, JP-U-Sho 62-32886 Patent Document discloses a handlebar arrangement for a motorcycle that includes a wire harness (e.g., a wiring member) connected to an operation part, and a lower holder into which the wire harness is inserted. The wire harness is guided, in an exposed manner, to an outside from a lower part of the lower holder to a prescribed part of the motorcycle.

SUMMARY OF THE INVENTION

To achieve the above and other objects, and in an exemplary aspect of the present invention, a vehicle includes: a headlight; a main switch; a first wiring member connected to the main switch and extending downward from the main switch; and a headlight supporting member for supporting the headlight provided in a vicinity of a lower part of the main switch as seen from a side of the vehicle. The first wiring member extending downward from the main switch may be disposed in an inside part of the headlight supporting member.

In the vehicle in accordance with the above exemplary aspects of the invention, the headlight supporting member for supporting the headlight may be provided in the vicinity of the lower part of the main switch as seen from a side of the vehicle, and the first wiring member extending downward from the main switch is disposed in the inside part of the headlight supporting member. Because of such a construction, the first wiring member can be prevented from being exposed to the outside, since the first wiring member is disposed in the inside part of the headlight supporting member provided in the vicinity of the lower part of the main switch as seen from a side of the vehicle. As a result, the first wiring member disposed between the main switch and the headlight supporting member can be sufficiently protected.

In the vehicle in accordance with the above exemplary aspects of the present invention, the headlight supporting member may include a concaved part, and the first wiring member may be disposed in the concaved part of the headlight supporting member. With such a construction, the first wiring member can be facilely protected by the headlight supporting member.

In the vehicle in accordance with the above exemplary aspects of the present invention, the headlight supporting member may be formed to cover the lower part of the main switch as seen from a side of the vehicle. With such a construction, the first wiring member extending downward from the main switch can be more certainly prevented from being exposed to the outside, since the first wiring member is disposed in the inside part of the headlight supporting member provided in the vicinity of the lower part of the main switch.

In the vehicle in accordance with the above exemplary aspects of the present invention, a pair of headlight supporting members may be provided, and the first wiring member may be disposed in an inside part of at least either one of the pair of headlight supporting members facing each other. With such a construction, the first wiring member can be facilely protected in the inside part of the pair of headlight supporting members facing each other.

In the vehicle with the first wiring member disposed in the inside part of at least either one of the pair of headlight supporting members facing each other, the headlight may include a first opening provided in a part covered by the headlight supporting member, and the first wiring member disposed in the inside part of the headlight supporting member may be inserted into the headlight via the first opening of the headlight. With such a construction, the first wiring member is prevented from being exposed to the outside, since the first wiring member is guided into the headlight from the headlight supporting member via the first opening. Therefore, the first wiring member can be sufficiently protected in a wiring path from the headlight supporting member to the headlight.

In the vehicle with the first wiring member disposed inside the headlight, the vehicle may further include a hose member for protecting the first wiring member. The headlight may further include a second opening through which the first wiring member is guided out, and the first wiring member is guided out from the second opening of the headlight while being covered by the hose member. With such a construction, the part of the first wiring member guided out from the second opening of the headlight can be sufficiently protected by the hose member.

In this case, the vehicle may further include a mainframe constructing a vehicle body, and the hose member covering the first wiring member is inserted into the mainframe. With such a construction, while the first wiring member is protected by the hose member, the first wiring member can be facilely inserted into the mainframe.

In the vehicle with the first wiring member disposed inside the headlight, the vehicle may further include a sensor element disposed in the inside part of the same headlight supporting member that the first wiring member is disposed, and provided with a second wiring member. The second wiring member may be inserted into the headlight together with the first wiring member via the first opening of the headlight. With such a construction, similar to the case of the first wiring member, the second wiring member can be disposed in a wiring path from the headlight supporting member into the headlight, so that the second wiring member is prevented from being exposed to the outside. Therefore, the second wiring member can be sufficiently protected in the path from the headlight supporting member to the headlight.

In the vehicle in accordance with the above exemplary aspect of the present invention, the vehicle may further include: a head pipe constructing a vehicle body; a bracket disposed above the head pipe; a pair of handlebar supporting members provided to extend upward from vicinities of both ends in the vehicle width direction of the main switch on an upper surface of the bracket; a handlebar pipe mounted on upper parts of the pair of handlebar supporting members; and a third wiring member disposed inside the handlebar pipe, and the third wiring member guided out from the handlebar pipe is disposed inside the pair of handlebar supporting members. With such a construction, the third wiring member guided out from the handlebar pipe is disposed inside the pair of handlebar supporting members, and thus the third wiring member can be facilely protected.

In the vehicle with the third wiring member disposed inside the handlebar pipe, each of the handlebar supporting members may include a concaved part and a lid part for covering the concaved part of the handlebar supporting member, and the third wiring member is disposed between the concaved part and the lid part of the handlebar supporting member. With such a construction, the third wiring member can be disposed inside the pair of handlebar supporting members by just mounting the lid part to cover the concaved part of the handlebar supporting member with the third wiring member disposed in the concaved part of the handlebar supporting member. Therefore, the third wiring member can be facilely disposed inside the pair of handlebar supporting members.

In the vehicle with the third wiring member disposed inside the handlebar pipe, the vehicle may further include a switch cover provided between the pair of handlebar supporting members as seen from above to cover the main switch from above, and the third wiring member guided out from the pair of handlebar supporting members is disposed inside the switch cover. In such a construction, the switch cover is provided to face the pair of handlebar supporting members. Thus, the third wiring member guided out from the pair of handlebar supporting members is prevented from being exposed to the outside by the switch cover, since the third wiring member is disposed in a wiring path from the handlebar supporting members to the switch cover. Therefore, the third wiring member can be sufficiently protected in the wiring path from the handlebar supporting members to the switch cover.

DETAILED DESCRIPTION OF THE INVENTION

The invention will now be described in more detail by way of example with reference to the embodiments shown in the accompanying Figures. It should be kept in mind that the following described embodiments are only presented by way of example and should not be construed as limiting the inventive concept to any particular physical configuration.

Further, if used and unless otherwise stated, the terms "upper," "lower," "front," "back," "over," "under," and similar such terms are not to be construed as limiting the invention to a particular orientation. Instead, these terms are used only on a relative basis.

Moreover, any term of degree used herein, such as "substantially", "essentially" and "nearly", means a reasonable amount of deviation of the modified word is contemplated such that the end result is not significantly changed. For example, such terms can be construed as allowing a deviation of at least 5% of the modified word if this deviation would not negate the meaning of the word the term of degree modifies.

The present invention is directed toward a wiring arrangement for a vehicle, which includes a headlight supporting member. In the exemplary embodiments, the vehicle is a motorcycle. However, it is contemplated that the concepts of the present invention may be applied to other types of vehicles within the spirit and scope of the invention. For example, the vehicle may be any vehicle that may use a headlight supporting member and/or a wiring arrangement, such as a bicycle, a three-wheeled vehicle, or an ATV (all terrain vehicle).

Figure 1:
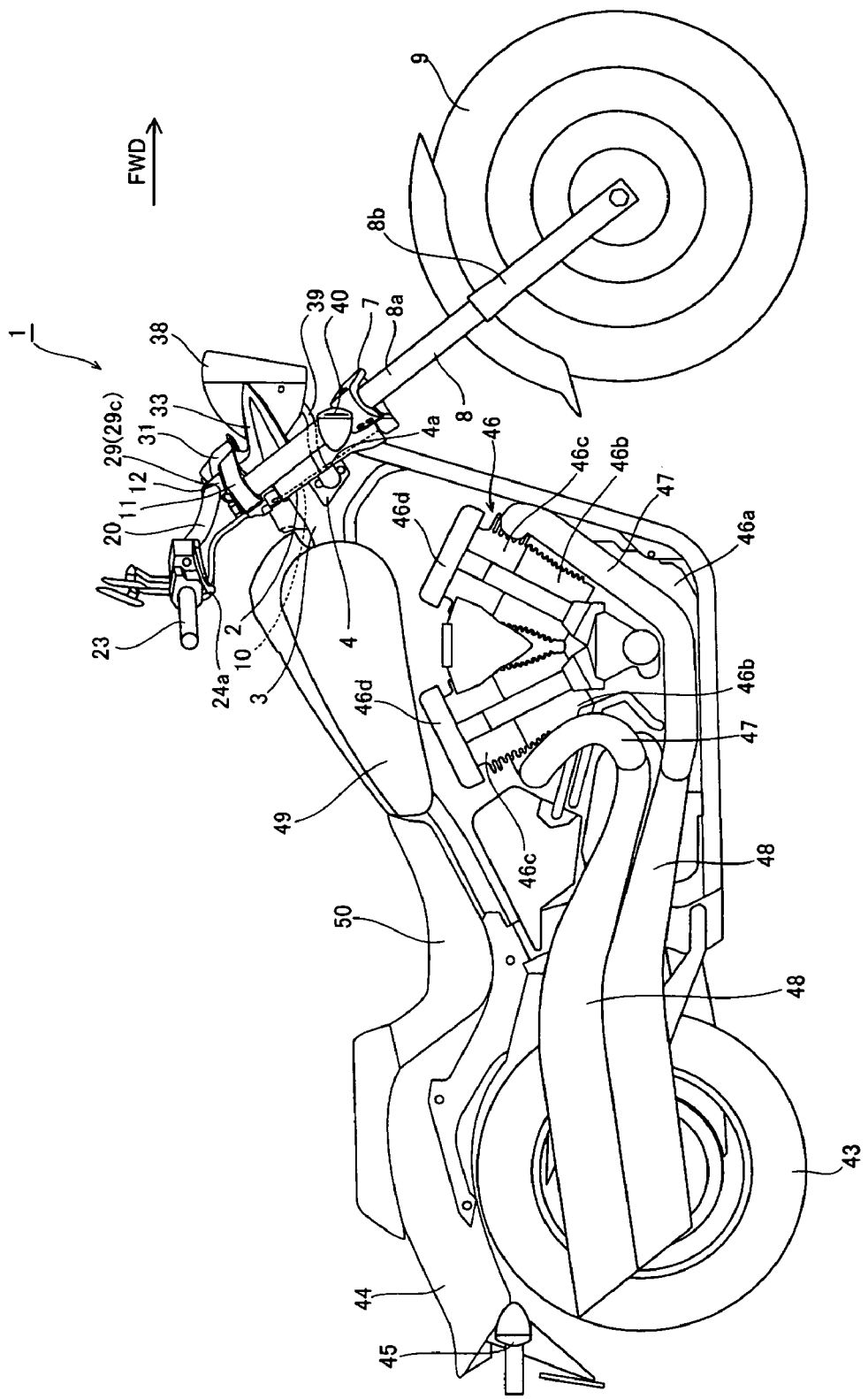
FIG. 1 is a right side view showing a general construction of a motorcycle according to an embodiment of the present invention.
Figure 3:
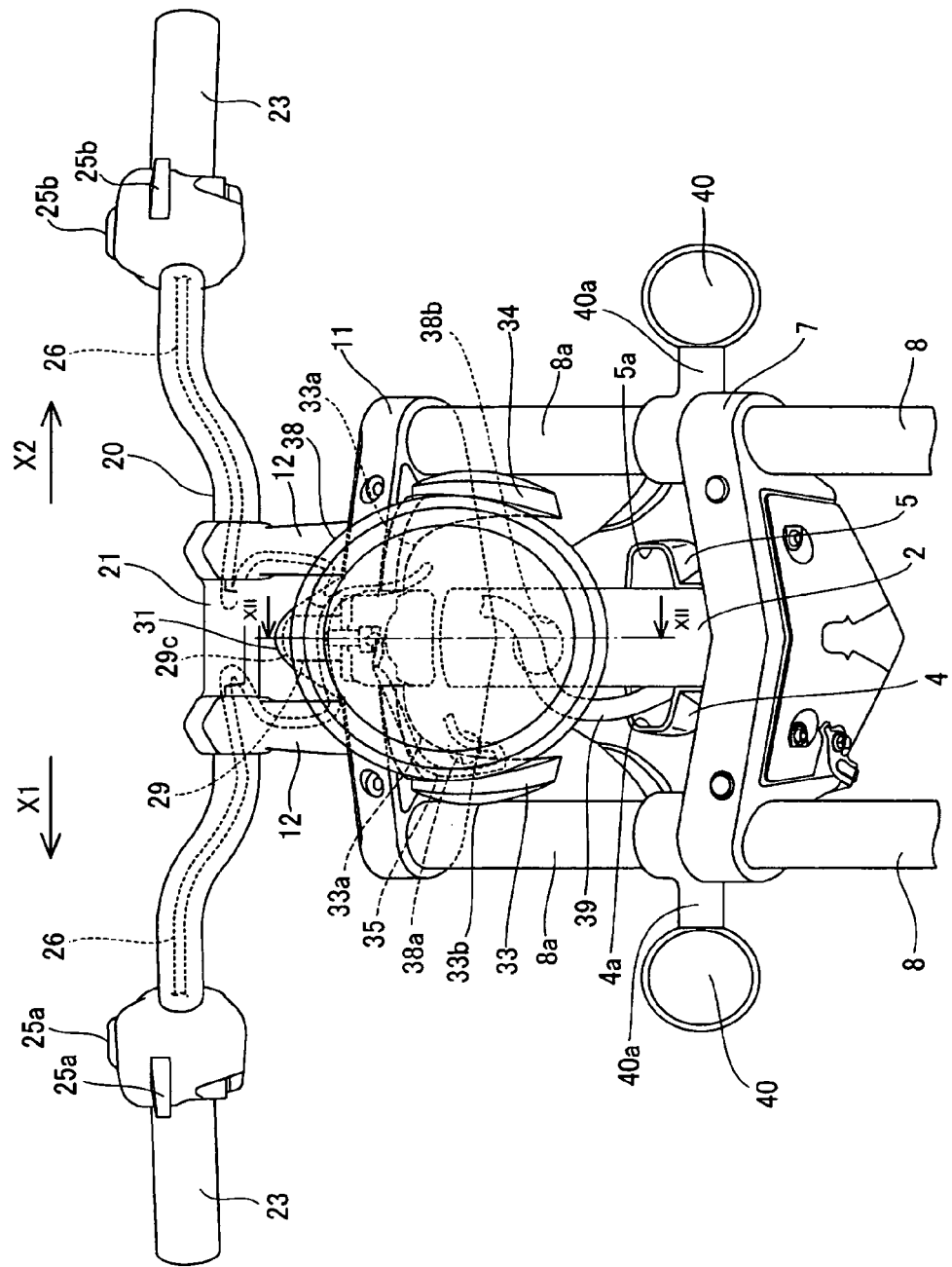
FIG. 3 is a front view showing an arrangement around a head pipe of the motorcycle shown in FIG. 1.

Referring to FIG. 1, a right side view of an entire a motorcycle according to one embodiment of the present invention is illustrated. In the drawings, the FWD arrow indicates a forward direction in which the vehicle runs. Any reference to a rearward direction will be taken to mean in a direction opposite to the forward direction. Further, any reference to a front and rear of the vehicle will be used in the usual and customary manner. Moreover, any reference to the width direction of the vehicle will be taken to mean in a direction perpendicular to the FWD arrow, and in the direction of the arrows X1 and X2, as shown in FIG. 3. Additionally, when reference is made to the left side of the vehicle, this is taken to mean the side as viewed in the direction of the arrow X1, with the front of the vehicle being disposed on the viewer's left. The right side will be the side opposite of the left side.

As shown in FIG. 1, the vehicle 1, according to one aspect of the present invention, includes a mainframe 3 connected to a rear part of a head pipe 2. The vehicle body is comprised of the head pipe 2 and the mainframe 3.

A cover member 4, made of resin for example, is mounted on a rear part of the head pipe 2 on one side, for example the right side, of the mainframe 3. A hose insertion opening 4a, which opens toward a traveling direction (in the direction of the FWD arrow), is provided in the cover member 4. A hose member 39, which will be more fully described later, is inserted in the hose insertion opening 4a. Further, an opening (not shown) may be formed in a part of the mainframe 3 on which the cover member 4 is mounted. The hose member 39, which is inserted in the cover member 4 via the hose insertion opening 4a, is inserted into the mainframe 3 via the non-illustrated opening.

Figure 2:
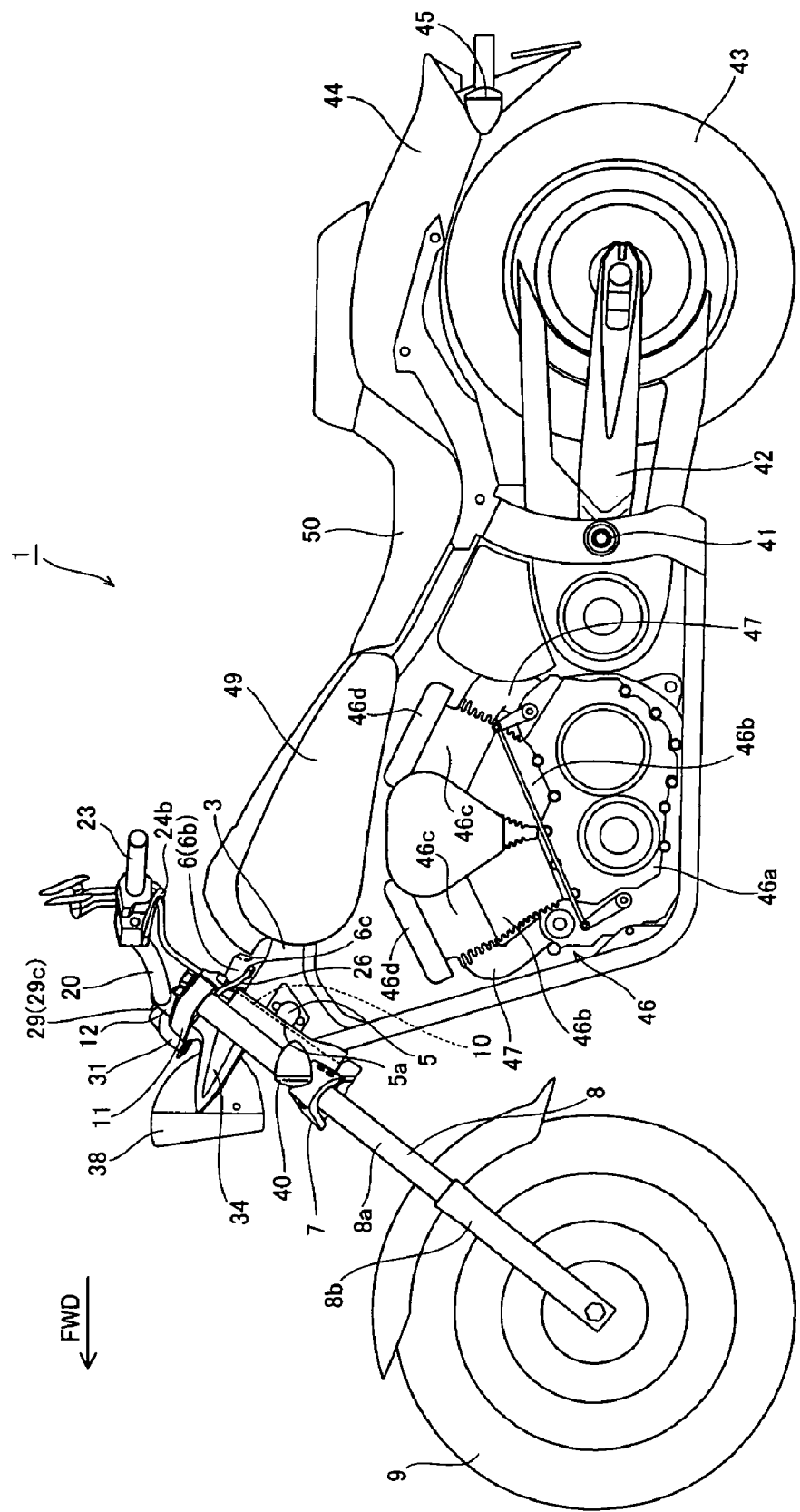
FIG. 2 is a left side view of the motorcycle shown in FIG. 1.

As shown in FIG. 2, a cover member 5, made of resin for example, is mounted on a rear part of the head pipe 2 on the other side, for example the left side, of the mainframe 3. A cable insertion opening 5a, which opens toward the traveling direction, is provided in the cover member 5. A throttle cable (not shown), for example, may be inserted in the cable insertion opening 5a.

Figure 6:
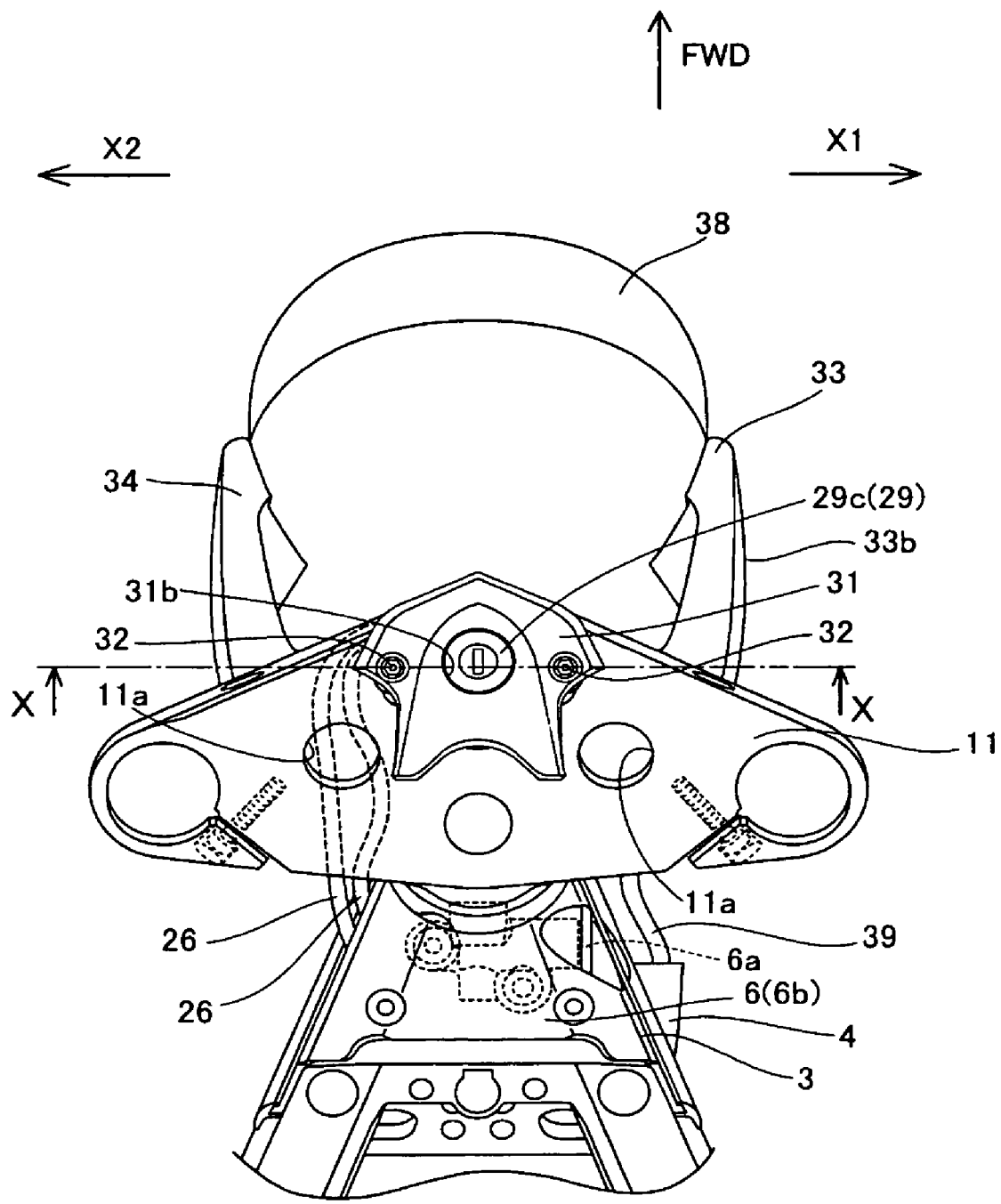
FIG. 6 is a plan view showing an area around an upper bracket and a switch cover of the motorcycle shown in FIG. 1.

Referring also to FIG. 6, a steering lock part 6 may be provided in a rear part of the head pipe 2 above the mainframe 3. The steering lock part 6 includes a steering lock system 6a, and a lock cover 6b for covering the steering lock system 6a. The steering lock system 6a is adapted to lock (and unlock) a handlebar pipe 20 to prevent it from turning, by using a key (not shown). As such, when the steering lock system 6a is locked, steering of the vehicle can not be controlled, thus deterring theft. As shown in FIG. 2, a notch part 6c, in which a wiring member, such as handlebar switch wirings 26, may be inserted, is formed in a side surface of the lock cover 6b.

As shown in FIG. 1, an under bracket 7 is disposed at a lower part of the head pipe 2. The under bracket 7 is rotatable relative to the head pipe 2. As shown in FIG. 3, a front fork 8 has a pair of legs that are individually mounted at the respective ends of the under bracket 7 in the vehicle width direction. Each leg of the front fork 8 includes an inner tube 8a disposed at an upper part thereof, and an outer tube 8b (see FIG. 1) disposed at a lower part thereof and slidable along the outer periphery of the inner tube 8a. As shown in FIG. 1, a front wheel 9 is mounted on a lower part of the respective outer tubes 8b. The front fork 8, on which the front wheel 9 is mounted, supports the vehicle body via the under bracket 7.

A steering shaft 10 is fitted in the under bracket 7, and is disposed to extend upward from the under bracket 7. Both the handlebar pipe 20 and an upper part of the steering shaft 10 are connected to an upper bracket 11. This allows the front wheel 9 to be turned by steering the handlebar pipe 20. A center part, in the vehicle width direction, of the upper bracket 11 covers the head pipe 2. Upper ends of the inner tubes 8a of the front fork 8 are fixed to the upper bracket 11.

Figure 4:
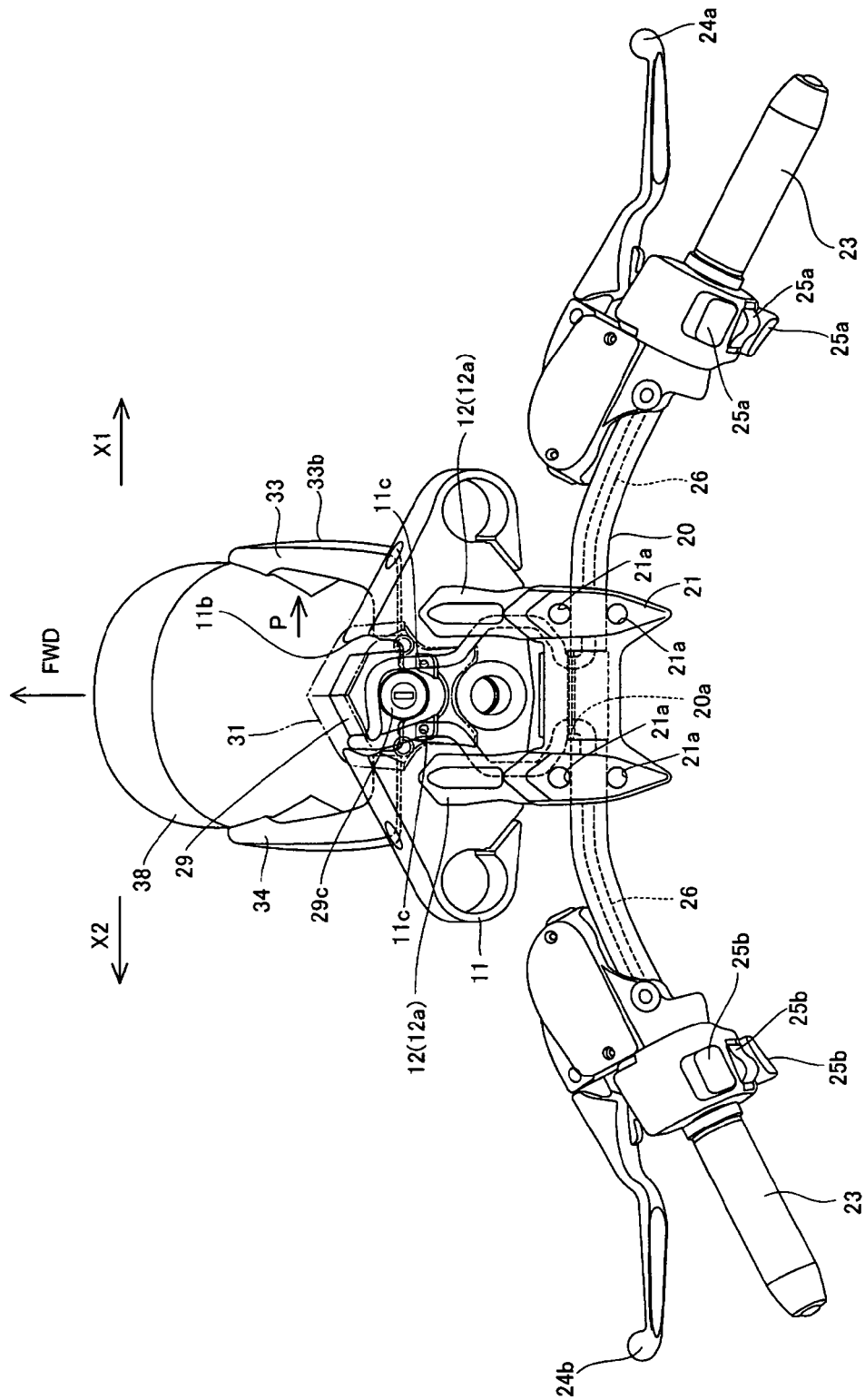
FIG. 4 is a plan view showing an area around a handlebar pipe and a headlight part of the motorcycle shown in FIG. 1.
Figure 5:
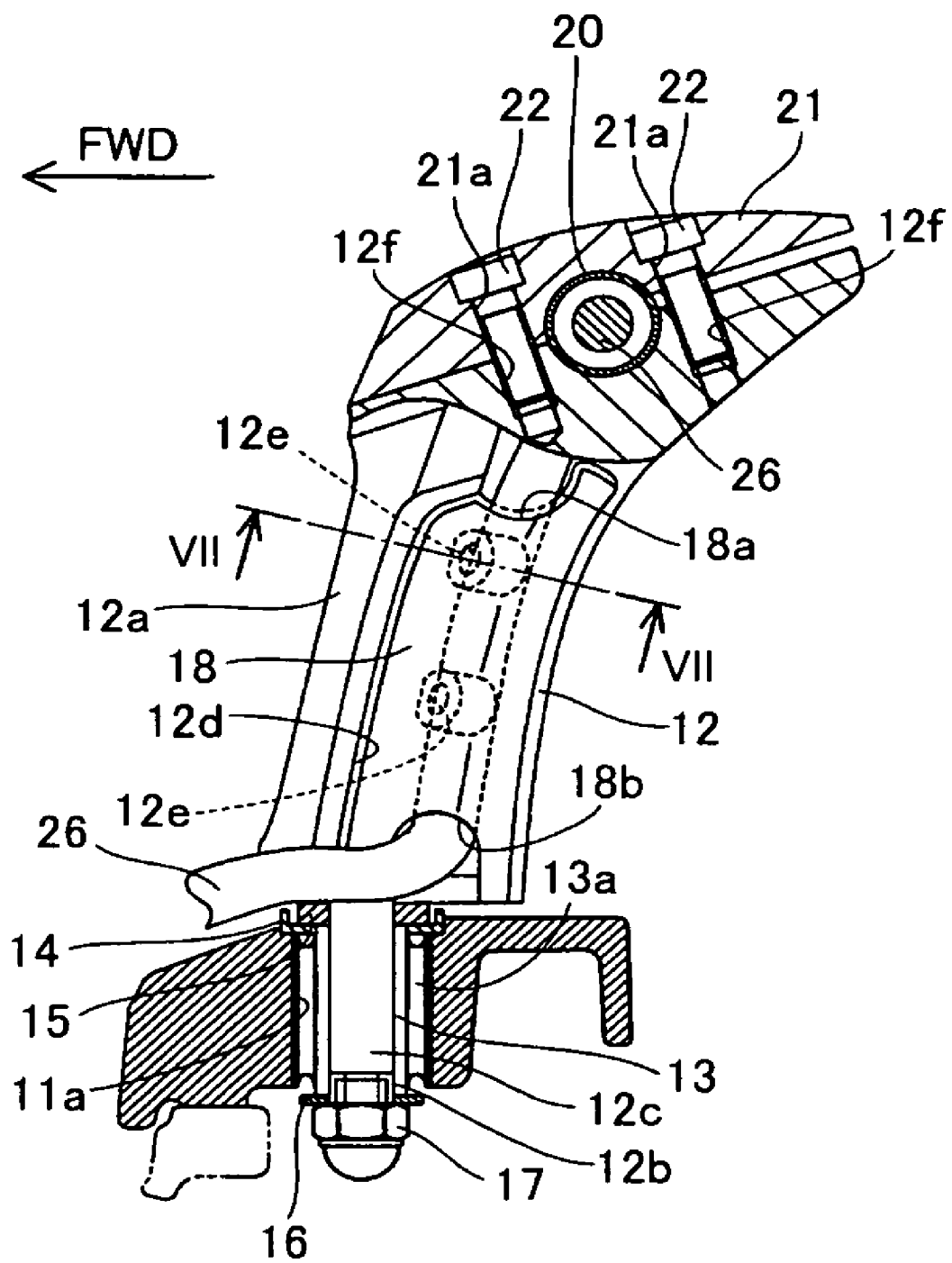
FIG. 5 is a partial cross-sectional view showing an area around a handlebar stay of the motorcycle shown in FIG. 1.

As shown in FIGS. 2 and 4, a pair of upwardly-protruding handlebar supporting members, such as handlebar stays 12, is mounted on an upper surface of the upper bracket 11. Specifically, and referring also to FIG. 5, each handlebar stay 12 includes a main body 12a, a supporting shaft 12c provided at a lower part of the main body 12a, and a bolt part 12b formed at a lower end of supporting shaft 12c. As shown in FIGS. 5 and 6, a pair of stay mounting holes 11a is formed in the upper bracket 11, which extends from the upper surface to the lower surface of the upper bracket. As shown in FIG. 5, a bush 13 is fitted in each respective stay mounting hole 11a. The outer peripheral surface of each bush 13 is formed with a shock absorber 13a adapted to absorb shocks. The supporting shaft 12c of the handlebar stay 12 is fitted within the respective bush 13. A damper 14 and a washer 15, which are adapted to attenuate micro-oscillations generated while traveling, are disposed at an upper part of each of the bushes 13. Each washer 15 supports a lower end face of the main body 12a of a respective one of the handlebar stays 12. A washer 16 and a nut 17 are mounted on the bolt part 12b at a lower part of each respective bush 13.

Figure 7:
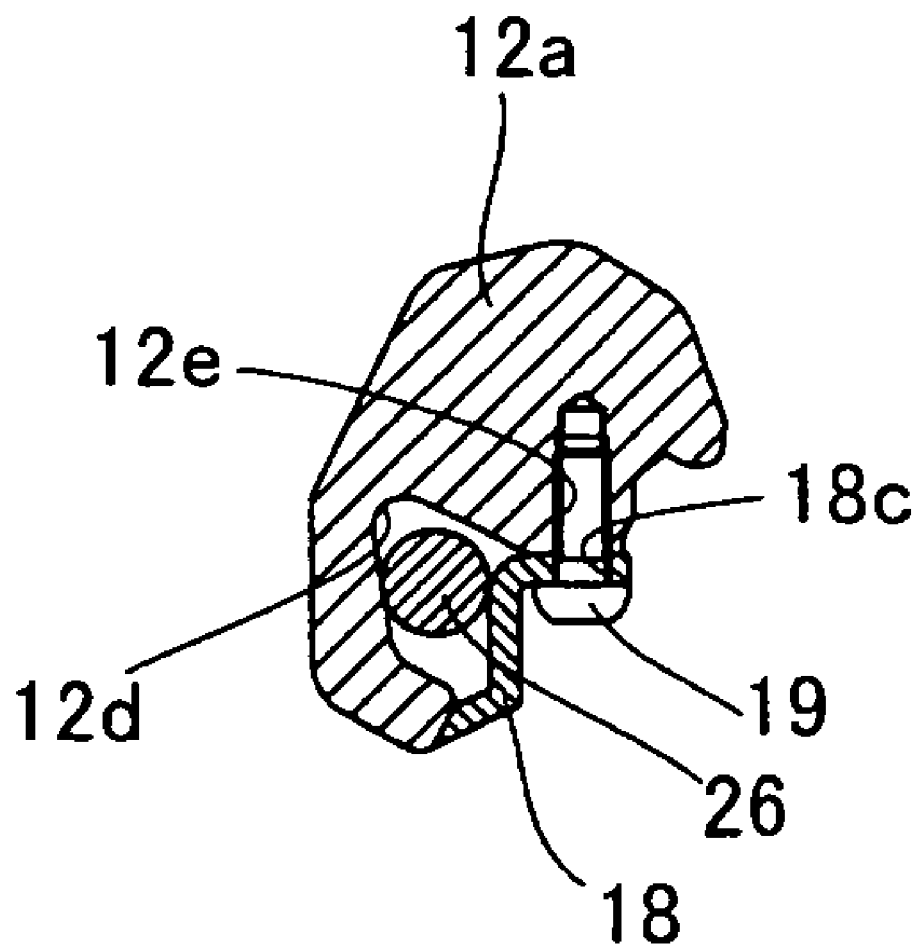
FIG. 7 is a cross-sectional view taken along line VII-VII in FIG. 5.

In this embodiment, as shown in FIGS. 5 and 7, concave portions 12d are formed in respective surfaces of the handlebar stays 12 that face each other. Each concave portion 12d is formed to extend in a vertical direction. A lid part, such as a lid member 18, is mounted on each concave portion 12d. The handlebar switch wirings 26 are disposed between the concave portion 12d and the lid member 18. As shown in FIG. 5, an upper part and a lower part of the lid member 18 includes a notch part 18a and a notch part 18b, respectively, through which the handlebar switch wirings 26 are guided. As shown in FIG. 7, bolt insertion holes 18c are formed in the lid member 18, and threaded holes 12e are formed in the handlebar stay 12. Further, bolt members 19 may be inserted in the bolt insertion holes 18c of the lid member 18 and screwed into the threaded holes 12e of the handlebar stay 12 to mount the lid members 18 on the respective handlebar stays 12.

As shown in FIGS. 4 and 5, a stay cover 21 is fixed to upper parts of the main bodies 12a of the handlebar stays 12 so that the handlebar pipe 20, which extends in the vehicle width direction, is disposed between the stay cover 21 and main bodies 12a. Specifically, four, for example, bolt insertion holes 21a are formed in an upper part of the stay cover 21, and two, for example, threaded holes 12f (see FIG. 5) are formed in each of the handlebar stays 12. Further, bolt members 22 are inserted in the bolt insertion holes 21a of the stay cover 21 and screwed into the respective threaded holes 12f of the handlebar stays 12 to mount the stay cover 21 on the handlebar stays 12. Thus, the handlebar pipe 20 can be fixed to the handlebar stays 12, so that when the handlebar pipe 20 is turned, the upper bracket 11 will be rotated via the pair of handlebar stays 12.

As shown in FIGS. 4 and 5, the handlebar pipe 20 may be hollow. As shown in FIG. 4, grips 23 are provided at both ends of the handlebar pipe 20. A brake lever 24a may be provided in a vicinity of the right side grip 23, for example. A clutch lever 24b may be provided in a vicinity of the left side grip 23, for example. Further, a plurality of switch parts 25a may be provided adjacent to the right side grip 23 on a side toward the stay cover 21. A plurality of switch parts 25b may be provided adjacent to the left side grip 23 on a side toward the stay cover 21. The handlebar switch wirings 26 are connected to the respective switch parts 25a and switch parts 25b. The handlebar switch wirings 26 are disposed inside the handlebar pipe 20. The handlebar switch wirings 26 transmit signals from the switch parts 25a and the switch parts 25b, which are hand-operated by a rider, to prescribed parts of the vehicle, such as an ECU (not shown), for example.

In this embodiment, there is a plurality of handlebar switch wirings 26, with each handlebar switch wiring being connected to a respective switch part 25a, 25b, guided through the handlebar pipe 20, and guided out from an opening 20a formed in a part of the handlebar pipe 20 that is covered by the stay cover 21. As shown in FIG. 5, after the handlebar switch wirings 26 are guided out from the opening 20a (see FIG. 4), they are inserted in the notch part 18a of the lid part 18, passed through the concave portion 12d, and subsequently guided out from the notch part 18b. That is, the handlebar switch wirings 26 are disposed to prevent their exposure between the opening 20a of the handlebar pipe 20 and the notch part 18b of the lid part 18. Each of the handlebar switch wirings 26, after being guided out from the notch parts 18b, is inserted in a switch cover 31 (see FIG. 6).

Figure 8:
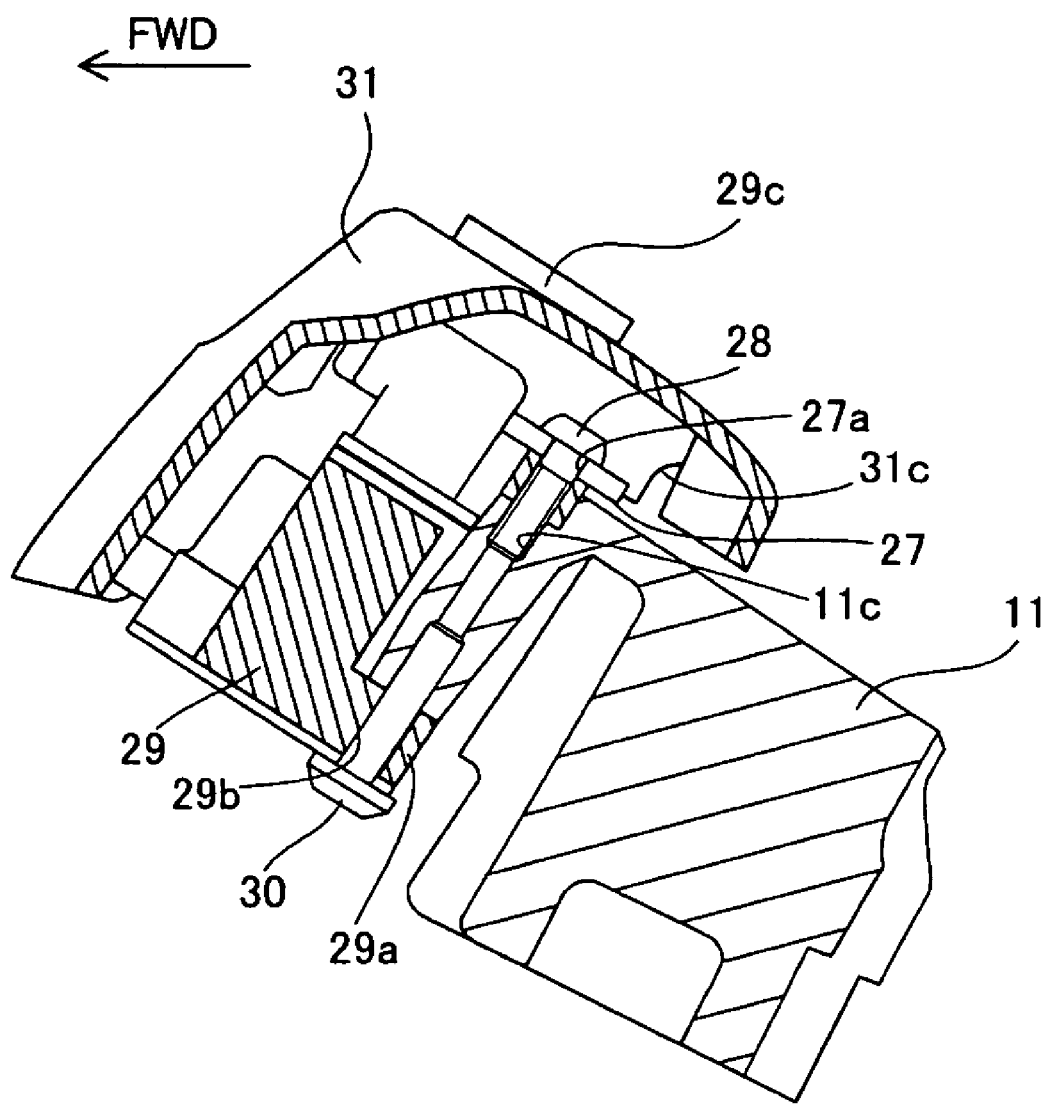
FIG. 8 is a cross-sectional view taken along line VIII-VIII in FIG. 9.
Figure 9:
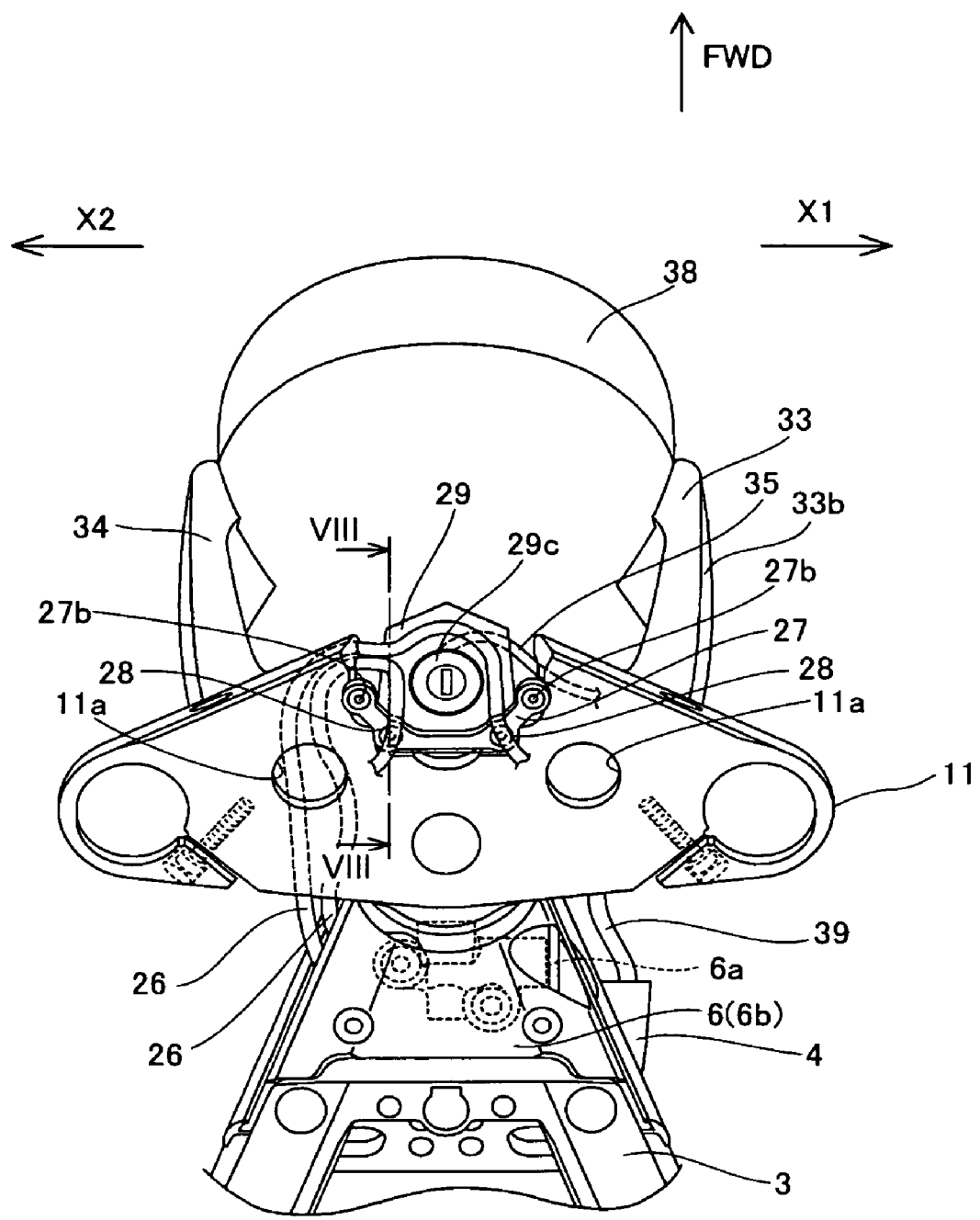
FIG. 9 is a plan view showing an area around the upper bracket and a main switch of the motorcycle shown in FIG. 1.

As shown in FIG. 4, a notch 11b may be formed in a front, center part of the upper bracket 11. A pair of threaded holes 11c is provided behind the notch 11b. As shown in FIG. 8, each threaded hole 11c passes through the upper bracket 11 in a generally vertical direction. As shown in FIGS. 8 and 9, a bracket 27 is disposed above the threaded holes 11c. Bracket 27 has bolt insertion holes 27a therein, which are in alignment with the respective threaded holes 11c. Two bolt members 28 are inserted through the respective bolt insertion holes 27a and are screwed into upper portions of the threaded holes 11c, to thereby fix the bracket 27 to the upper bracket 11. As shown in FIG. 8, a mounting part 29a of a main switch 29 is disposed below the threaded holes 11c. Main switch 29 has two bolt insertion holes 29b therein, and which are in alignment with the respective threaded holes 11c. Two bolt members 30 are inserted through the respective bolt insertion holes 29b and screwed into lower portions of the threaded holes 11c, to thereby fix the main switch 29 to the upper bracket 11.

Figure 10:
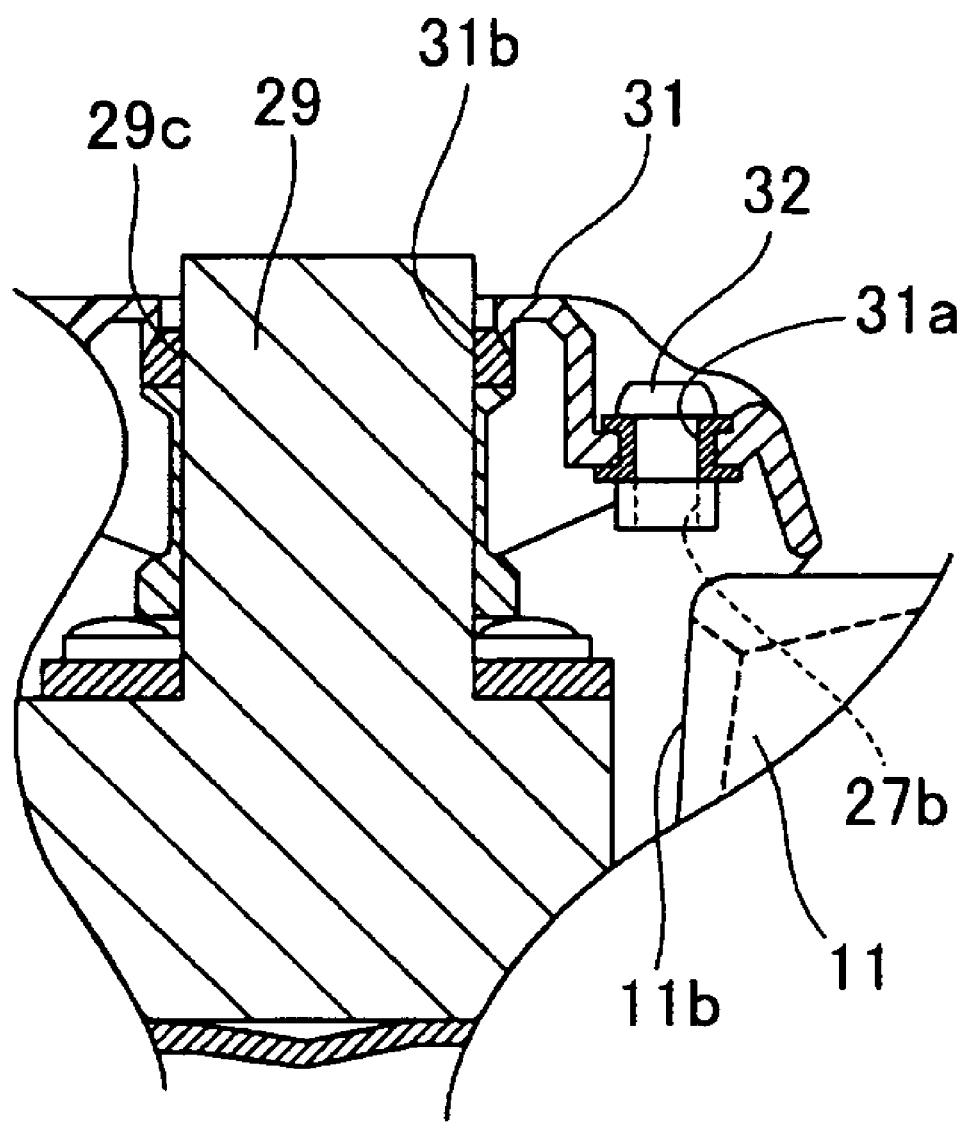
FIG. 10 is a cross-sectional view taken along line X-X in FIG. 6.
Figure 11:
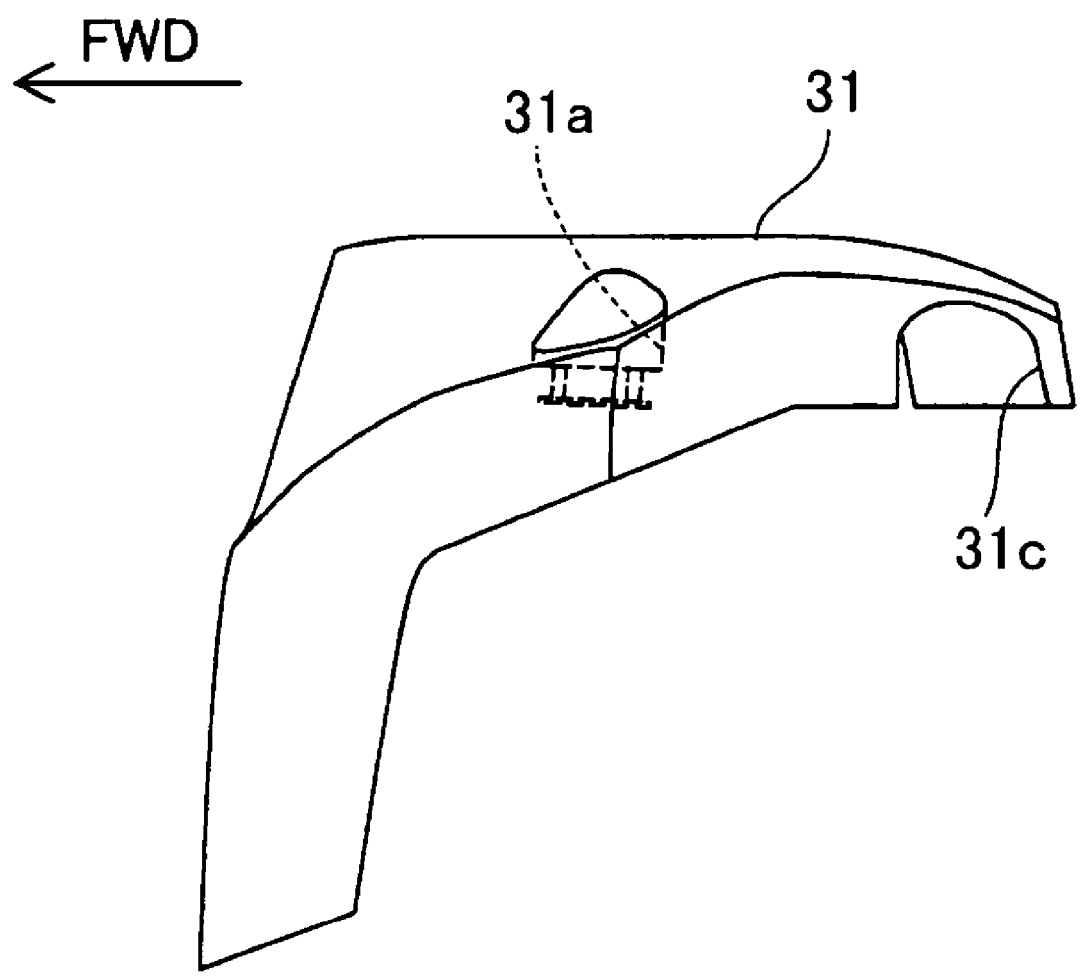
FIG. 11 is a side view showing the switch cover of the motorcycle shown in FIG. 1.

As shown in FIGS. 9 and 10, a pair of threaded holes 27b may be formed in vicinities of the respective ends of the bracket 27. As shown in FIG. 9, the switch cover 31 is disposed over the threaded holes 27b and covers the main switch 29. Switch cover 31 includes two bolt insertion holes 31a, each being in alignment with a respective threaded hole 27b. As shown in FIGS. 6 and 10, two bolt members 32 are inserted through the respective bolt insertion holes 31a, and screwed into the threaded holes 27b (see FIG. 10), to thereby fix the switch cover 31 to the bracket 27. An opening 31b is formed in an upper part of the switch cover 31. A key insertion part 29c of the main switch 29 is inserted in the opening 31b. As shown in FIG. 11, a notch 31c is formed in each side surface of the switch cover 31. The notches 31c are formed to face the respective lower notch parts 18b (see FIG. 5) of the lid parts 18 mounted on the handlebar stays 12. The handlebar switch wirings 26 guided out from the notch parts 18b of the respective lid members 18 are inserted in the respective notches 31c of the switch cover 31. That is, the handlebar switch wirings 26 are arranged to prevent their exposure to the outside between the respective lower notch parts 18b of the lid members 18 and the respective notches 31c of the switch cover 31.

As shown in FIGS. 4 and 9, each of the two handlebar switch wirings 26 (see FIG. 4) extends in the forward direction when inside the switch cover 31. As shown in FIGS. 2 and 9, the handlebar switch wirings 26 are then guided in the direction of the arrow X2, and through a region of the notch 11b (see also FIG. 10) of the upper bracket 11, then under and toward the rear of the upper bracket 11, and then inserted in the notch part 6c (see FIG. 2) of the lock cover 6b of the steering lock part 6.

Figure 12:
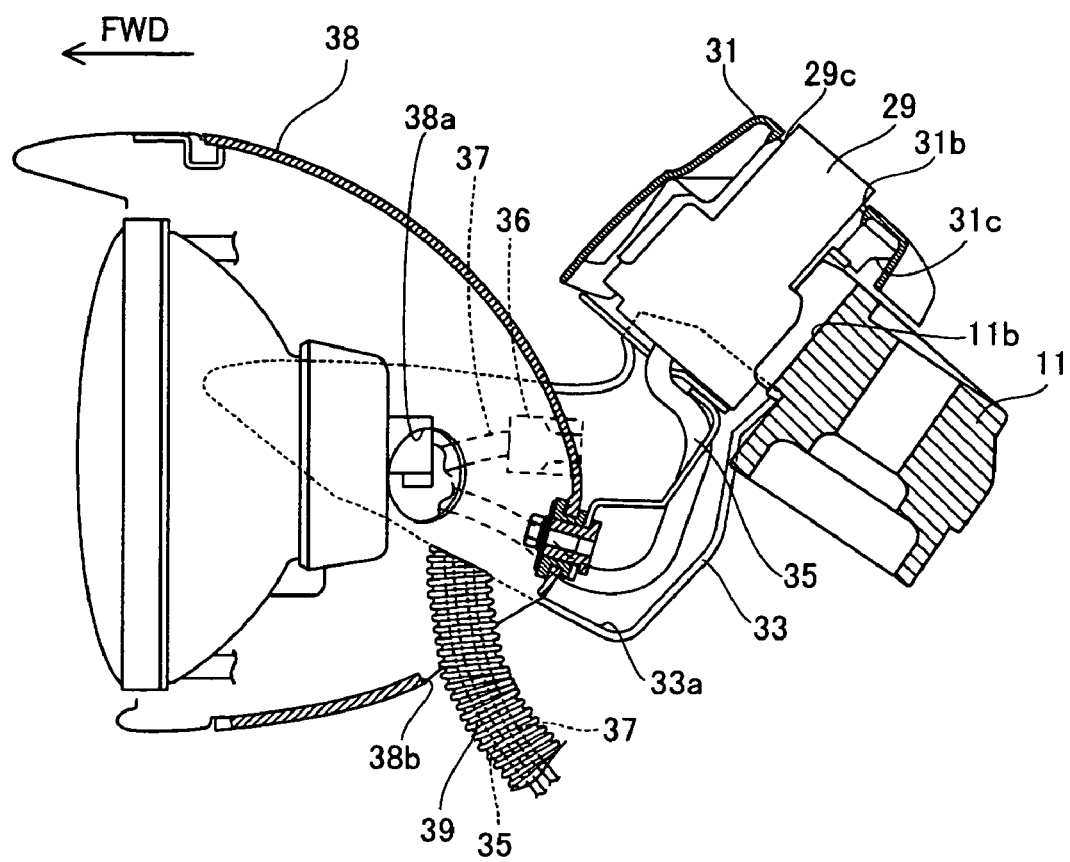
FIG. 12 is a cross-sectional view taken along line XII-XII in FIG. 3.
Figure 13:
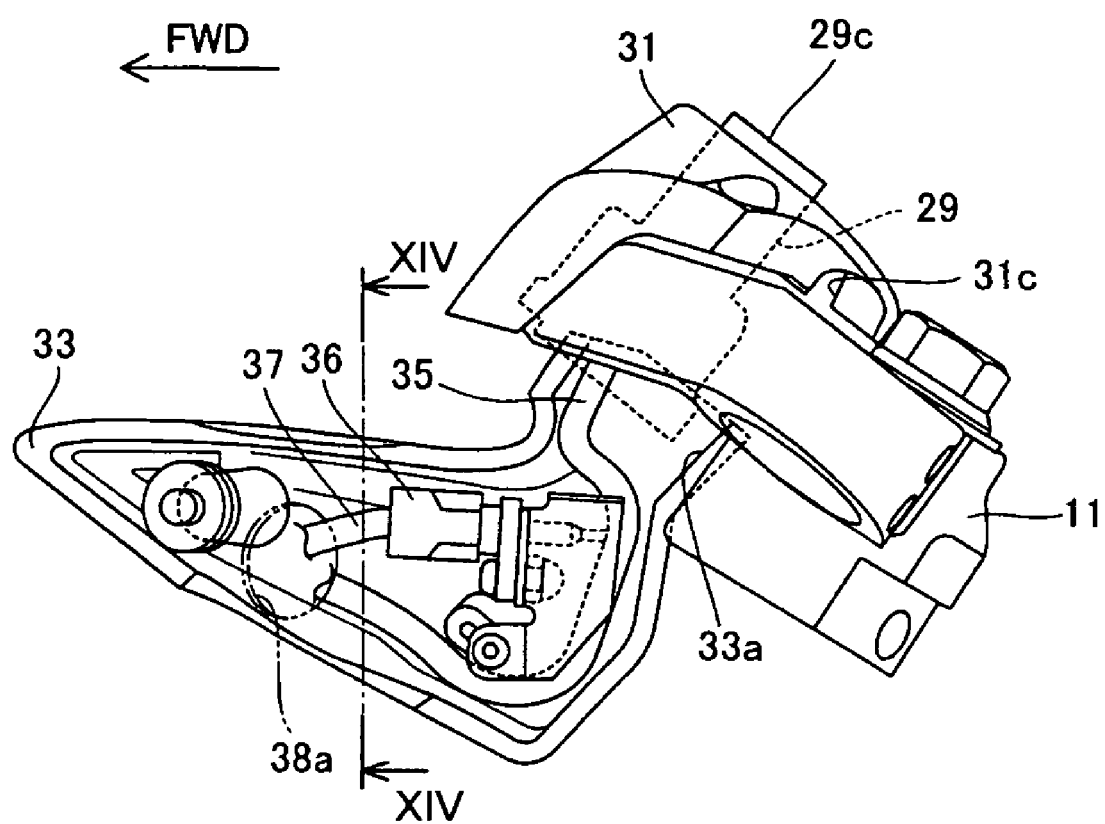
FIG. 13 is a view as seen from the direction of the arrow P in FIG. 4.

In this exemplary embodiment, as shown in FIGS. 3 and 4, a pair of headlight supporting members, such as headlight stays 33 and 34, for retaining a headlight, such as headlight part 38, is provided on a lower surface of the upper bracket 11. The headlight stay 33 extends first in the direction of the arrow X1 from the notch part 11b of the upper bracket 11, then downward and forward in the direction of the FWD arrow. As shown in FIGS. 12 and 13, a part of the headlight stay 33 which is mounted on the upper bracket 11 is provided near a lower part of the main switch 29 as seen from a side (from the direction of the arrow X1 or X2).

Figure 14:
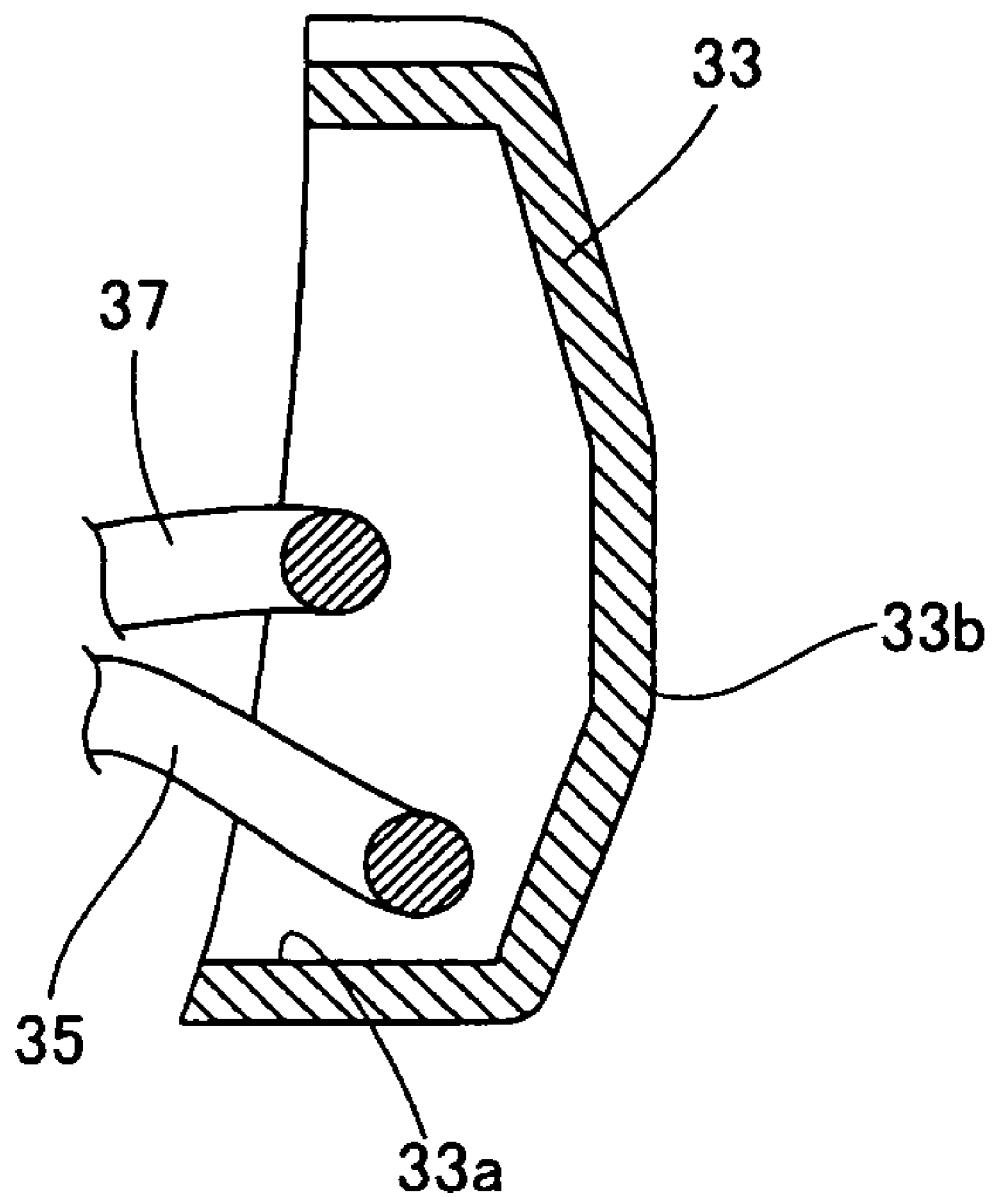
FIG. 14 is a cross-sectional view taken along line XIV-XIV in FIG. 13.

In this exemplary embodiment, as shown in FIG. 3, the headlight stay 33 has a concave portion 33a formed upward relative to the portion of the headlight stay 33 that is mounted on the upper bracket 11, e.g., the concave portion is formed in an inside surface of the headlight stay and opposite to an outer surface 33b (see FIG. 3) of the headlight stay. As shown in FIGS. 13 and 14, the concave portion 33a continues to a front end of the headlight stay 33. As shown in FIGS. 12 and 13, a wiring member, such as a main switch wiring 35, extends downward from the main switch 29, and is disposed in the concave portion 33a. Specifically, as shown in FIG. 3, the main switch wiring 35 is guided out from a lower part of the main switch 29 in the direction of the arrow X1, and is disposed in a part of the concave portion 33a of a portion of the headlight stay 33 mounted on the upper bracket 11. Then, as shown in FIGS. 12 and 13, the main switch wiring 35 is directed along a lower, rear part of the concave portion 33a, and then toward the front end of the concave portion.

In this exemplary embodiment, and as best shown in FIG. 12, a sensor element 36 that detects atmospheric temperature may be mounted in the concave portion 33a of the headlight stay 33. A wiring member, such as sensor wiring 37, is connected to the sensor element 36. The sensor wiring 37, together with the main switch wiring 35, are inserted into the headlight part 38 via a first opening 38a.

As shown in FIG. 3, the other headlight stay 34 extends in the direction of the arrow X2 from the notch part 11b of the upper bracket 11, and then extends downward and forward, in the direction of the FWD arrow. That is, a part of the headlight stay 34 which is mounted on the upper bracket 11 is provided adjacent the lower part of the main switch 29 as seen from a side (from the direction of the arrow X1 or X2), in a manner similar to the headlight stay 33. In this example, no wirings or the like are disposed in the headlight stay 34.

In this exemplary embodiment, as shown in FIGS. 4 and 12, the headlight part 38 is mounted on front parts, in the direction of the FWD arrow, of the headlight stays 33 and 34. The opening 38a (see FIG. 12) is formed in a portion of the headlight part 38 near where the headlight stay 33 is mounted. As shown in FIG. 12, the opening 38a allows the main switch wiring 35 and the sensor wiring 37 to be inserted into the headlight part from the concave portion 33a of the headlight stay 33. That is, the main switch wiring 35 and the sensor wiring 37 are disposed so that they are not exposed between the concave portion 33a of the headlight stay 33 and the headlight part 38.

In this exemplary embodiment, a hose member 39, made of resin for example, may also be disposed inside the headlight part 38. The main switch wiring 35 and the sensor wiring 37, after they are inserted into the headlight part 38, are disposed inside the hose member 39. A second opening 38b is formed in a lower rear portion of the headlight part 38. The hose member 39 is guided outside of the headlight part 38 from the opening 38b. As shown in FIG. 1, the hose member 39 is inserted in the hose insertion opening 4a of the cover member 4, which was described above. Accordingly, as shown in FIG. 12, the main switch wiring 35 and the sensor wiring 37 are not exposed between the headlight part 38 and the cover member 4.

As shown in FIG. 3, flashing lamps 40 may be individually disposed above the under bracket 7. In this exemplary embodiment, the flashing lamps 40 are mounted on the respective inner tubes 8a of the fork 8 via brackets 40a.

As shown in FIG. 2, in this exemplary embodiment, a pivot shaft 41 may be provided at a lower part of the mainframe 3. A front end of a rear arm 42 is pivotally supported by the pivot shaft 41 so as to be swingable in a generally vertical direction. A rear wheel 43 is rotatably mounted at a rear end of the rear arm 42. A rear fender 44 is disposed above the rear wheel 43. A pair of flashing lamps 45 is mounted at a rear portion of the rear fender 44.

As shown in FIGS. 1 and 2, an engine 46 is disposed on the mainframe 3. The engine 46 may be an air-cooled engine, and constructed with a crankcase 46a, a cylinder block 46b, a cylinder head 46c, and a cylinder head cover 46d, for example. As shown in FIG. 1, an exhaust pipe 47 is connected to the cylinder head 46c of the engine 46. A rearwardly-extending muffler 48 is connected to the exhaust pipe 47. A fuel tank 49 is disposed above the engine 46. A speedometer (not shown) may be disposed in at an upper part of the fuel tank 49. A seat 50 is provided behind the fuel tank 49.

In this exemplary embodiment, as described above, the headlight stay 33 for supporting the headlight part 38 is provided in a region of a lower part of the main switch 29 as seen from a side of the vehicle (from the direction of the arrow X1 or X2). Further, the main switch wiring 35 extending downward from the main switch 29 is disposed in the concave portion 33a (e.g., an inside portion) of the headlight stay 33. Thus, the main switch wiring 35 is not exposed to the outside. As a result, the main switch wiring 35 disposed between the main switch 29 and the headlight stay 33 is well protected.

In this exemplary embodiment, the main switch wiring 35 disposed in the concave portion 33a of the headlight stay 33 is inserted into the headlight part 38 via the opening 38a. Thus, not only is the main switch wiring 35 not exposed to the outside, but it is also guided into the headlight part 38 from the headlight stay 33 via the opening 38a. Therefore, the main switch wiring 35 is well protected from the headlight stay 33 to the headlight part 38.

In this exemplary embodiment, the main switch wiring 35 is covered by the hose member 39 when it is guided out from the opening 38b of the headlight part 38. Thus, the main switch wiring 35 is protected by the hose member 39 when guided out from the opening 38b of the headlight part 38.

In this exemplary embodiment, the hose member 39 covering the main switch wiring 35 is inserted into the mainframe 3 via the hose insertion opening 4a of the cover member 4. Thus, the main switch wiring 35 is facilely inserted into the mainframe 3 while being protected by the hose member 39.

In this exemplary embodiment, the sensor wiring 37 is inserted into the headlight part 38 together with the main switch wiring 35 via the opening 38a. Thus, similar to the main switch wiring 35, the sensor wiring 37 is prevented from being exposed to the outside while extending from the headlight stay 33 into the headlight part 38. Therefore, the sensor wiring 37 is well protected between the headlight stay 33 and the headlight part 38.

It should be understood that the embodiments disclosed herein are exemplary in all respects, and the present invention is not limited thereto. The scope of the present invention is not limited by the descriptions about the foregoing embodiments, but by the claims. Further, the present invention includes all modifications and equivalents that fall within the spirit and scope of the claims.

In the above embodiments, descriptions are made about a case that the concave portion is provided in the headlight stay and the main switch wiring is disposed in the concave portion. However, the present invention is not limited to this case. Instead, the headlight stay may be formed to have a tubular shape, with the main switch wiring being disposed inside the tubular headlight stay.

Further, a lid member may be provided to cover the main switch wiring and the sensor wiring disposed in the concave portion, with the lid member being mounted on the headlight stay. This would further protect the main switch wiring and the sensor wiring.

In the above exemplary embodiments, a pair of headlight stays has been described as being provided, with the main switch wiring and the sensor wiring being disposed in one of the headlight stays. However, the present invention is not limited to this arrangement. Instead, only one headlight stay may be provided, with the main switch wiring and the sensor wiring being disposed in the one headlight stay.

Further, three or more headlight stays may be provided, with the main switch wiring and the sensor wiring being disposed in any one or more of the headlight stays.

It will be apparent to one skilled in the art that the manner of making and using the claimed invention has been adequately disclosed in the above-written description of the preferred embodiments taken together with the drawings.

It will be understood that the above description of the preferred embodiments of the present invention are susceptible to various modifications, changes and adaptations, and the same are intended to be comprehended within the meaning and range of equivalents of the appended claims.

It will be apparent to one skilled in the art that the manner of making and using the claimed invention has been adequately disclosed in the above-written description of the preferred embodiments taken together with the drawings.

It will be understood that the above description of the preferred embodiments of the present invention are susceptible to various modifications, changes and adaptations, and the same are intended to be comprehended within the meaning and range of equivalents of the appended claims.

What is claimed is:

1. A vehicle, comprising:
a headlight;
a main switch;
a wiring member connected to the main switch and extending downward from the main switch; and
a headlight supporting member that supports the headlight, and being located at a lower part of the main switch, the wiring member being disposed in an inside part of the headlight supporting member,
wherein the headlight supporting member is attached to the headlight at a portion in which a first opening is provided and the wiring member is inserted into the headlight via the first opening.

2. The vehicle according to claim 1, wherein the headlight supporting member includes a concave portion, and
the wiring member is disposed in the concave portion of the headlight supporting member.

3. A vehicle, comprising:
a headlight;
a main switch;
a wiring member connected to the main switch and extending downward from the main switch; and
a headlight supporting member that supports the headlight, and being located at a lower part of the main switch, the wiring member being disposed in an inside part of the headlight supporting member, wherein the headlight supporting member covers the lower part of the main switch.

4. The vehicle according to claim 1,
wherein the headlight supporting member comprises a first headlight supporting portion and a second headlight supporting portion, and
wherein the inside part of the first headlight supporting portion faces the second headlight supporting portion.

5. A vehicle, comprising:
a headlight;
a main switch;
a wiring member connected to the main switch and extending downward from the main switch; and
a headlight supporting member that supports the headlight, and being located at a lower part of the main switch, the wiring member being disposed in an inside part of the headlight supporting member,
wherein the headlight supporting member includes a first headlight supporting portion and a second headlight supporting portion, wherein the inside part of the first headlight supporting portion faces the second headlight supporting portion,
wherein the first headlight supporting portion covers a portion of the headlight,
wherein the headlight includes a first opening provided in the portion covered by the first headlight supporting portion, and
wherein the wiring member disposed in the inside part of the first headlight supporting portion is inserted into the headlight via the first opening.

6. The vehicle according to claim 5, further comprising a hose member for protecting the wiring member,
wherein the headlight further includes a second opening through which the wiring member is guided out, and
the wiring member is guided out from the second opening while being covered by the hose member.

7. The vehicle according to claim 6, further comprising a vehicle body that includes a mainframe, and
wherein the hose member, while covering the wiring member, is inserted into the mainframe.

8. The vehicle according to claim 5, wherein the wiring member comprises a first wiring member, and further comprising:

a sensor element disposed in the inside part of the first headlight supporting portion, and being provided with a second wiring member, wherein the second wiring member is inserted into the headlight together with the first wiring member via the first opening.

9. A vehicle, comprising:

a headlight;

a main switch;

a wiring member connected to the main switch and extending downward from the main switch;

a headlight supporting member that supports the headlight, and being located at a lower part of the main switch, the wiring member being disposed in an inside part of the headlight supporting member;

a vehicle body that includes a head pipe;

a bracket disposed above the head pipe;

a pair of upwardly-extending handlebar supporting members provided on respective opposing ends of the bracket in the vehicle width direction;

a handlebar pipe mounted on an upper portion of the handlebar supporting members; and a further wiring member disposed inside the handlebar pipe, the further wiring member, after being guided out from the handlebar pipe, being disposed inside at least one of the handlebar supporting members.

10. The vehicle according to claim 9, wherein the at least one of the handlebar supporting members includes a concave part, and a lid that covers the concave part, and the further wiring member is disposed between the concave part and the lid of the handlebar supporting member.

11. The vehicle according to claim 9, further comprising:

a switch cover provided between the handlebar supporting members, that covers the main switch from above, wherein the further wiring member, after being guided out from the at least one of the handlebar supporting members, is disposed inside the switch cover.

12. A vehicle, comprising:

a wiring member;

a headlight supporting member, the wiring member being disposed in an inside portion of the headlight supporting member, the headlight supporting member including a concave portion, and the wiring member is disposed in the concave portion of the headlight supporting member; and a headlight, wherein the headlight supporting member supports the headlight, and covers a portion of the headlight, wherein the headlight includes a first opening provided in the portion covered by the headlight supporting member, and wherein the wiring member disposed in the concave portion of the headlight supporting member is inserted into the headlight via the first opening.

13. The vehicle according to claim 12, further comprising a hose member for protecting the wiring member, wherein the headlight further includes a second opening through which the wiring member is guided out from the headlight, and wherein the wiring member is guided out from the second opening while being covered by the hose member.

14. A vehicle, comprising:

a wiring member;

a headlight supporting member, the wiring member being disposed in an inside portion of the headlight supporting member;

a bracket;

at least one handlebar supporting member provided to extend upward from the bracket;

a handlebar pipe mounted on an upper portion of the handlebar supporting member; and a further wiring member having a first portion disposed inside the handlebar pipe, the further wiring member having a second portion that is guided out from the handlebar pipe, and that is disposed inside the handlebar supporting member.

15. The vehicle according to claim 14, wherein the handlebar pipe includes a hole through which the second portion of the further wiring member is guided out of the handlebar pipe, wherein the handlebar supporting member includes a concave part, and a lid that covers the concave part, the lid having an upper notch disposed adjacent to the handlebar pipe hole, and a lower notch, and the second portion of the further wiring member extends from the handlebar pipe hole, through the upper notch, between the concave part and the lid of the handlebar supporting member, and out from the lower notch, respectively.

16. The vehicle according to claim 15, further comprising:

a stay cover that connects to an upper portion of the handlebar supporting member, with the handlebar pipe being fixed therebetween, the stay cover covering the handlebar pipe hole and the upper notch;

a main switch; and a switch cover provided adjacent to the handlebar supporting member, and covering the mainswitch, the switch cover having a notch in a side thereof, the switch cover notch being disposed adjacent to the lower notch of the lid, wherein the second portion of the further wiring member, after being guided out from the lower notch, passes through the switch cover notch, and extends inside the switch cover.

* * * * *